United States Patent
Kim et al.

(10) Patent No.: US 12,430,784 B2
(45) Date of Patent: Sep. 30, 2025

(54) ELECTRONIC DEVICE AND OPERATING METHOD OF ELECTRONIC DEVICE

(71) Applicant: Samsung Electronics Co., Ltd., Suwon-si (KR)

(72) Inventors: Sang Woo Kim, Pohang-si (KR); Bum Jun Kim, Pohang-si (KR)

(73) Assignees: Samsung Electronics Co., Ltd., Gyeonggi-do (KR); Postech Research and Business Development Foundation, Pohang-si (KR)

( * ) Notice: Subject to any disclaimer, the term of this patent is extended or adjusted under 35 U.S.C. 154(b) by 459 days.

(21) Appl. No.: 17/949,439

(22) Filed: Sep. 21, 2022

(65) Prior Publication Data

US 2023/0215028 A1 Jul. 6, 2023

(30) Foreign Application Priority Data

Jan. 6, 2022 (KR) ........................ 10-2022-0002363

(51) Int. Cl.
  *G06T 7/55* (2017.01)
  *H04N 13/243* (2018.01)
  *H04N 13/00* (2018.01)

(52) U.S. Cl.
  CPC ............. *G06T 7/55* (2017.01); *H04N 13/243* (2018.05); *G06T 2207/20081* (2013.01); *G06T 2207/20224* (2013.01); *H04N 2013/0081* (2013.01)

(58) Field of Classification Search
  CPC ............. G06T 7/55; G06T 2207/20081; G06T 2207/20224; H04N 13/243; H04N 2013/0081

(Continued)

(56) References Cited

U.S. PATENT DOCUMENTS 10,832,432 B2  11/2020  Anisimovskiy et al.
11,062,470 B2  7/2021  Kweon et al.
(Continued)

FOREIGN PATENT DOCUMENTS

KR  10-2017-0082794 A  7/2017

OTHER PUBLICATIONS

Ye, Xinchen, et al. "Unsupervised monocular depth estimation via recursive stereo distillation." IEEE Transactions on Image Processing 30 (2021): 4492-4504. (Year: 2021).*

(Continued)

*Primary Examiner* — Jonathan S Lee
(74) *Attorney, Agent, or Firm* — Harness, Dickey & Pierce, P.L.C.

(57) ABSTRACT

Disclosed is an operating method of an electronic device which includes a processor performing machine learning of a monocular depth estimation module. The operating method includes obtaining, by the processor, a first image and a second image respectively photographed by a first camera and a second camera of different locations, inferring, by the processor, a plurality of multi-cyclic disparities by applying weights of the monocular depth estimation module to the first image plural times and calculating a plurality of multi-cyclic loss functions based on the first image, the second image, and the plurality of multi-cyclic disparities, and updating, by the processor, the weights of the monocular depth estimation module through machine learning, based on the plurality of multi-cyclic loss functions.

18 Claims, 9 Drawing Sheets

(58) Field of Classification Search
USPC .......................................................... 382/100
See application file for complete search history.

(56) References Cited

U.S. PATENT DOCUMENTS

| | | |
|---|---|---|
| 11,100,401 B2 | 8/2021 | Godard et al. |
| 2017/0200284 A1 | 7/2017 | Lee et al. |
| 2020/0226777 A1 | 7/2020 | Luo et al. |
| 2021/0027207 A1 | 1/2021 | Bongio Karrman et al. |
| 2021/0150278 A1 | 5/2021 | Dudzik et al. |

OTHER PUBLICATIONS

Godard, Clément, Oisin Mac Aodha, and Gabriel J. Brostow. "Unsupervised monocular depth estimation with left-right consistency." Proceedings of the IEEE conference on computer vision and pattern recognition. 2017. (Year: 2017).*

Süvari, Cemal Barkan. Semi-supervised iterative teacher-student learning for monocular depth estimation. MS thesis. Middle East Technical University, 2021. (Year: 2021).*

Pilzer, Andrea, et al. "Refine and distill: Exploiting cycle-inconsistency and knowledge distillation for unsupervised monocular depth estimation." Proceedings of the IEEE/CVF Conference on Computer Vision and Pattern Recognition. 2019. (Year: 2019).*

Kuznietsov, Yevhen, Jorg Stuckler, and Bastian Leibe. "Semi-supervised deep learning for monocular depth map prediction." Proceedings of the IEEE conference on computer vision and pattern recognition. 2017. (Year: 2017).*

Garg, Ravi, et al. "Unsupervised cnn for single view depth estimation: Geometry to the rescue." Computer Vision-ECCV 2016: 14th European Conference, Amsterdam, The Netherlands, Oct. 11-14, 2016, Proceedings, Part VIII 14. Springer International Publishing, 2016. (Year: 2016).*

Clément Godard et al., "Unsupervised monocular depth estimation with left-right consistency," arXiv:1609.03677v3 [cs.CV] Apr. 12, 2017.

\* cited by examiner

ELECTRONIC DEVICE AND OPERATING METHOD OF ELECTRONIC DEVICE

CROSS-REFERENCE TO RELATED APPLICATIONS

This application claims priority under 35 U.S.C. § 119 to Korean Patent Application No. 10-2022-0002363 filed on Jan. 6, 2022, in the Korean Intellectual Property Office, the disclosure of which is incorporated by reference herein in its entirety.

BACKGROUND

Embodiments of the present disclosure described herein relate to an electronic device, and more particularly, relate to an electronic device performing monocular depth estimation and an operating method of the electronic device.

Technologies for measuring distances to objects are being researched, for example for use with autonomous (or self-driving) vehicles that drive without user control. In these, and similar cases, the distances to the objects should be accurately measured to determine a driving route of the autonomous vehicle.

Distance measuring means such as LiDAR (light detection and ranging or laser imaging, detection, and ranging) and/or a photographing means such as two or more cameras may be used to measure the distances to the objects. Alternatively, monocular depth estimation may be used to measure distances to objects from an image obtained from one camera. Because only one camera is used for the monocular depth estimation, the monocular depth estimation may be implemented at a relatively low price.

SUMMARY

Embodiments of the present disclosure provide an electronic device implementing a monocular depth estimation module with improved accuracy and an operating method of the electronic device.

According to an embodiment, an operating method of an electronic device, which includes a processor configured to train a monocular depth estimation module, includes obtaining, by the processor, a first image photographed by a first camera and a second image photographed by a second camera; inferring, by the processor, a plurality of multi-cyclic disparities by applying weights of the monocular depth estimation module to the first image a plurality of times and calculating a plurality of multi-cyclic loss functions based on the first image, the second image, and the plurality of multi-cyclic disparities; and updating, by the processor, the weights of the monocular depth estimation module through the training based on the plurality of multi-cyclic loss functions.

According to an embodiment, an electronic device includes a first camera, an interface device that communicates with an external database, and a processor that executes a monocular depth estimation module. The processor obtains a first image and a second image from the external database through the interface device, infer a plurality of multi-cyclic disparities corresponding to pixels of the second image by applying weights of the monocular depth estimation module to the first image and calculate a plurality of multi-cyclic loss functions corresponding to the pixels of the second image based on the first image, the second image, and the plurality of multi-cyclic disparities, and updates the weights of the monocular depth estimation module through machine learning based on the plurality of multi-cyclic loss functions. The processor obtains a third image from the first camera, infers disparities by applying the weights of the monocular depth estimation module to the third image, and calculates depth data of the third image from the disparities.

According to an embodiment, an electronic device includes a camera, and a processor that executes a monocular depth estimation module. The processor obtains an image from the camera, infers disparities from the image using the monocular depth estimation module, and generates depth data of the image from the disparities. The monocular depth estimation module is trained based on a plurality of multi-cyclic disparities and a plurality of multi-cyclic loss functions respectively generated from pixels.

BRIEF DESCRIPTION OF THE FIGURES

The above and other objects and features of the present disclosure will become apparent by describing in detail example embodiments thereof with reference to the accompanying drawings.

DETAILED DESCRIPTION

Below, examples embodiments of the present disclosure may be described in detail and clearly to such an extent that an ordinary one in the art easily implements the present disclosure. Below, the term "and/or" is interpreted as including any one of the items listed with regard to the term, or a combination of some (or all) of the listed items.

Figure 1:
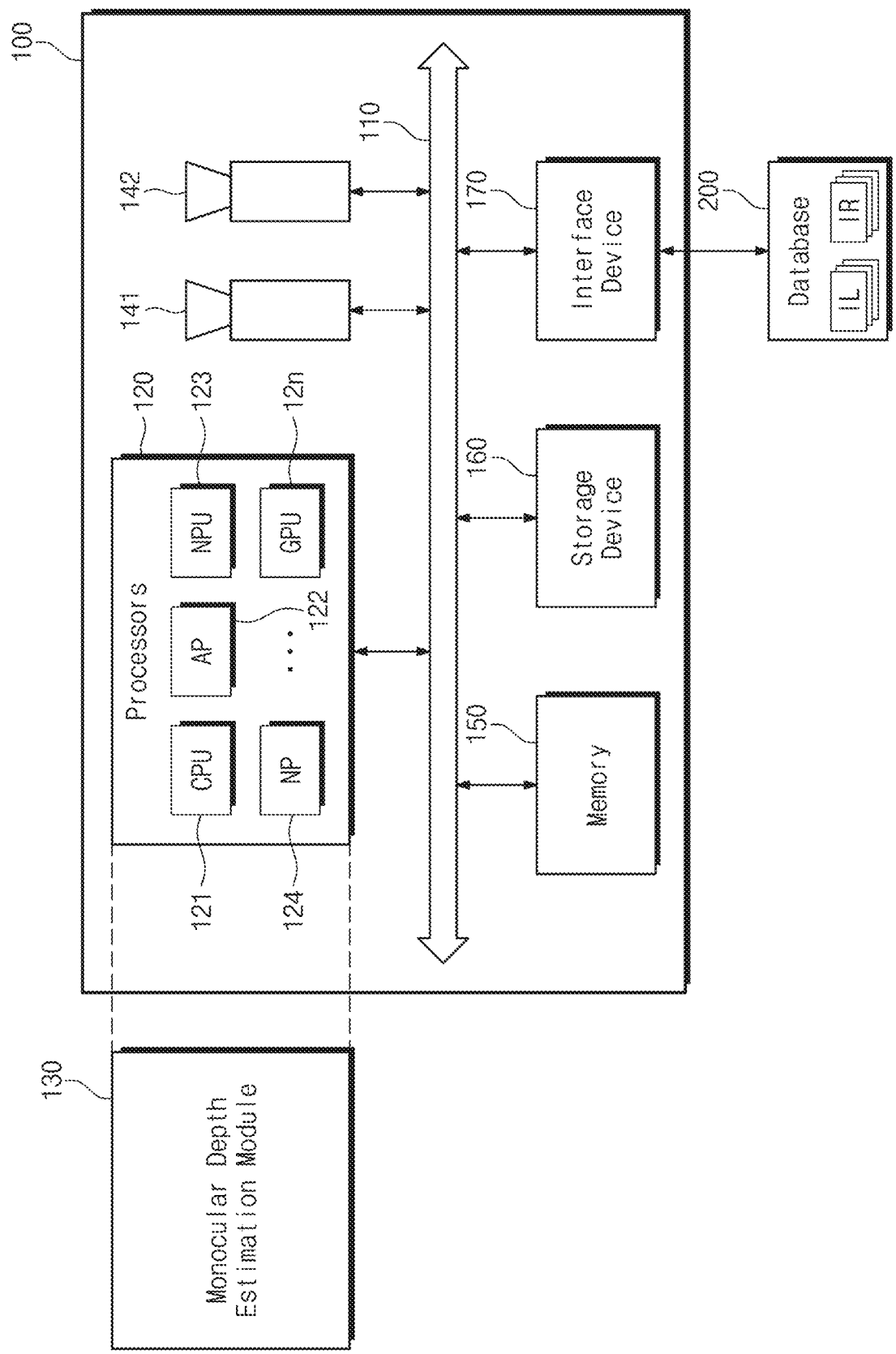
FIG. 1 illustrates an electronic device according to at least one embodiment of the present disclosure.

FIG. 1 illustrates an electronic device 100 according to at least one embodiment of the present disclosure. Referring to FIG. 1, the electronic device 100 may include a bus 110, processors 120, a first camera 141, a second camera 142, a memory 150, a storage device 160, and an interface device 170.

The bus 110 may provide a channel (e.g., for communication) between the components of the electronic device 100. The bus 110 may transfer various signals including at least one of a command, an address, data, and a control signal between the components of the electronic device 100.

The processors 120 may execute an operating system and various applications of the electronic device 100. The processors 120 may include at least one processor. For example, the processors 120 may include at least one of various processors (or processing cores) such as a central processing unit (CPU) 121, an application processor (AP) 122, a neural processing unit (NPU) 123, a neuromorphic processor (NP) 124, a graphics processing unit (GPU) 12*n*, and/or the like.

At least one of the processors 120 may execute a monocular depth estimation module 130. For example, the monocular depth estimation module 130 may be implemented based on a neural network. For example, the monocular depth estimation module 130 may include at least one of various kinds of neural networks such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, a Bayesian Neural Network (BNN) and/or the like. Additionally (and/or alternatively), the deep learning model (s) may be trained based on at least one of various algorithms such as regression, linear and/or logistic regression, random forest, a support vector machine (SVM), and/or other types of models, such as statistical clustering, Bayesian classification, decision trees, dimensionality reduction such as principal component analysis, expert systems, combinations thereof including ensembles such as random forests, and/or the like.

The processors 120 may train the monocular depth estimation module 130 such that the monocular depth estimation module 130 infers depth data from one image data. For example, the processors 120 may train the monocular depth estimation module 130 by using a pair of images obtained from cameras of different locations.

The processors 120 may infer a depth from one of the pair of images and may calculate a multi-cyclic loss function by using the other image. The processors 120 may train the monocular depth estimation module 130 based on a multi-cyclic scheme. For example, during the multi-cyclic scheme, two or more inference operations may be performed on a pair of images, and thus, the accuracy of the monocular depth estimation module 130 may be improved.

The first camera 141 and the second camera 142 may photograph images of the same direction (or similar directions) at different locations. For example, the first camera 141 and the second camera 142 may oriented towards a first direction and may be spaced apart from each other in a second direction such that the image data collected by the first camera 141 at least partially overlaps with the image data collected by the second camera 142. Though both the first camera 141 and the second camera 142 are illustrated as being included in the electronic device 100, the example embodiments are not limited thereto. For example, in some example embodiments, one of the first camera 141 or the second camera 142 may be external to the electronic device 100 and/or removable. The pair of images obtained by the first camera 141 and the second camera 142 may be transferred to the memory 150 through the bus 110 and may be used for the training (or learning) of the monocular depth estimation module 130 in the processors 120.

The memory 150 may be used as a working memory of the processors 120. The memory 150 may be implemented with various random access memories such as a dynamic random access memory (DRAM), a magnetic RAM (MRAM), a phase-change RAM (PRAM), a ferroelectric RAM (FRAM), a resistive RAM (RRAM), and/or the like.

The storage device 160 may store original or backup copies of various data that are used by the processors 120. The storage device 160 may be and/or include, for example, non-volatile memory implemented with a hard disk drive and/or a solid state drive. The solid state drive may be implemented with various nonvolatile solid state memories such as flash memory, magnetic memory, ferroelectric memory, phase-change memory, resistive memory, and/or the like.

The interface device 170 may be configured to communicate with the outside (e.g., with a device external to the electronic device 100). For example, the interface device 1700 may include various wired or wireless interfaces, which may communicate with external devices. For example, the wired interface may include at least one of a coaxial interface, an ethernet interface, a universal serial bus (USB) interface, and/or the like; and the wireless interface may include at least one of a communication interface that may be connected to a mobile cellular network, such as a local area network (LAN), a wireless LAN (WLAN) like Wireless Fidelity (Wi-fi), a wireless personal area network (WPAN) like Bluetooth, a wireless USB, Zigbee, near field communication (NFC), radio-frequency identification (RFID), power line communication (PLC), third-generation (3G), fourth-generation (4G), fifth-generation (5G), long-term evolution (LTE), and/or the like. The interface device 170 may communicate with an external database 200. The external database 200 may include first images IL and second images IR. The first images IL and the second images IR may be pairs of images photographed in the same direction (or similar directions) by cameras at different locations.

The interface device 170 may receive the first images IL and the second images IR from the database 200 and may transfer the first images IL and the second images IR to the memory 150. The pairs of first images IL and second images IR stored in the memory 150 may be used to train the monocular depth estimation module 130 in the processors 120.

Figure 2:
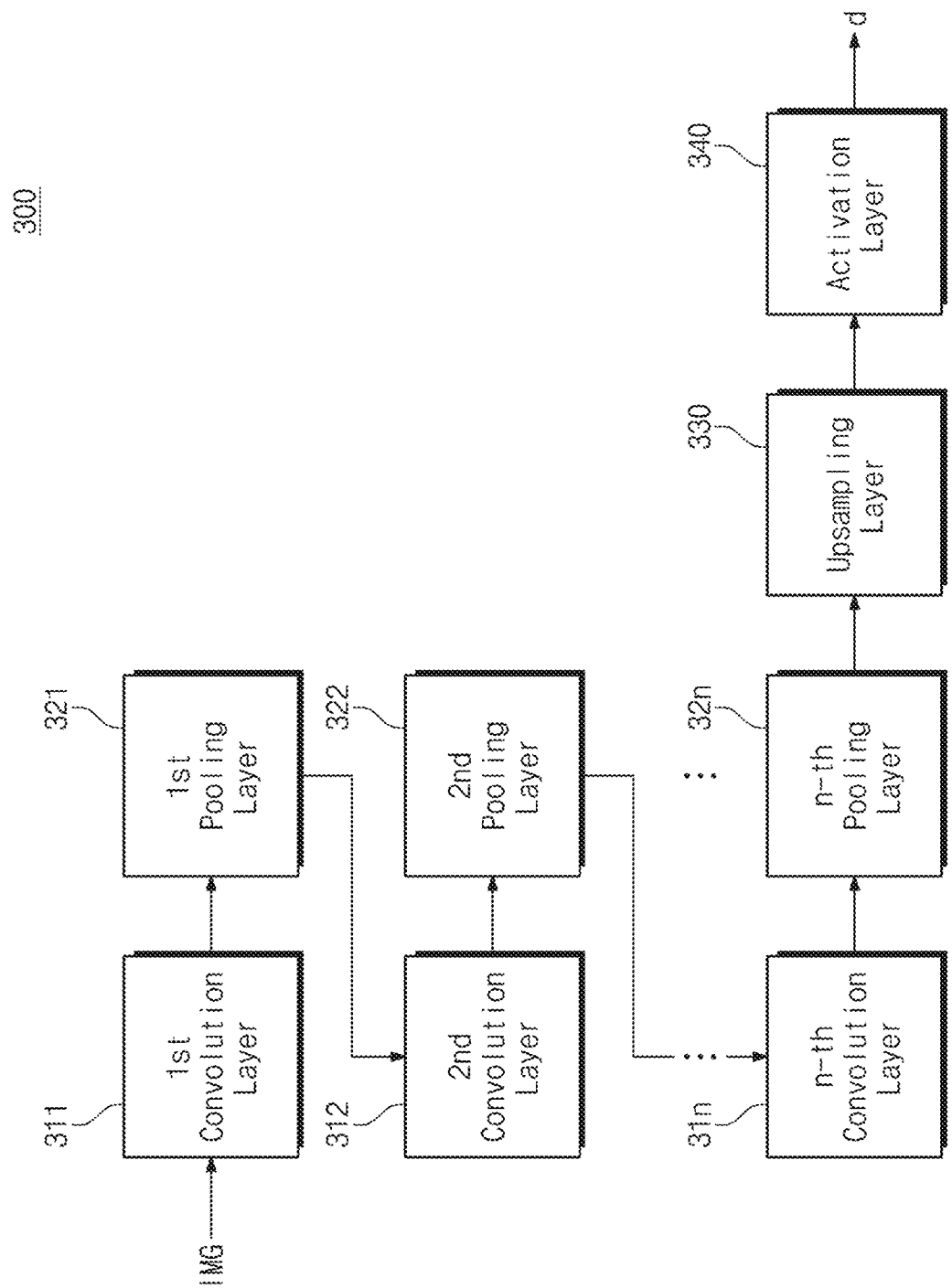
FIG. 2 illustrates an example of a monocular depth estimation module of FIG. 1.

FIG. 2 illustrates an example of the monocular depth estimation module 130 of FIG. 1. Referring to FIGS. 1 and 2, the monocular depth estimation module 300 may include first to n-th convolution layers 311 to 31*n*, first to n-th pooling layers 321 to 32*n*, an upsampling layer 330, and an activation layer 340.

Each of the first to n-th convolution layers 311 to 31*n* may perform a convolution operation on input data by using internal parameters (e.g., weights). The input data of the first convolution layer 311 may be an image IMG. For example, the image IMG may be one of the first images IL or the second images IR. Input data of the second to n-th convolution layers 312 to 31*n* may respectively correspond to output data of the first to (n−1)-th pooling layers 321 to 32*n*.

The first to n-th pooling layers 321 to 32*n* may perform sub-sampling on the output data of the first to n-th convolution layers 311 to 31*n*. Output data of the n-th pooling layer 32*n* may be transferred to the upsampling layer 330. The upsampling layer 330 may upsample the output data of the n-th pooling layer 32*n* to a size of the image IMG.

The activation layer 340 may apply an activation function (such as sigmoid, softmax, and/or the like) to output data of the upsampling layer 330. An output of the activation layer 340 may be an inferred disparity "d". In some examples, because the output data of the upsampling layer 330 has the size of the image IMG, the output data of the activation layer 340 may have the size of the image IMG. The output data of the activation layer 340 may include disparities of pixels of the image IMG.

In at least one example embodiment, the upsampling layer 330 may be a deconvolution layer or an up-convolution layer. A monocular depth estimation module 300 in which an input and an output are equal in size as illustrated in FIG. 2 may be a fully convolutional network (FCN) or an encoder-decoder based model.

As another example, the monocular depth estimation module 300 may be configured to infer integrated disparity information, instead of the disparity "d" of each of the pixels. For example, the monocular depth estimation module 300 may be implemented with a convolutional neural network (CNN) or a conditional CNN (c-CNN).

In the CNN or c-CNN, the upsampling layer 330 may be replaced with a fully connected layer. The fully connected layer may convert the output data of the n-th pooling layer $32n$ into a 1-dimensional vector. The activation layer 340 may infer the integrated disparity information of the output data of the fully connected layer.

Figure 3:
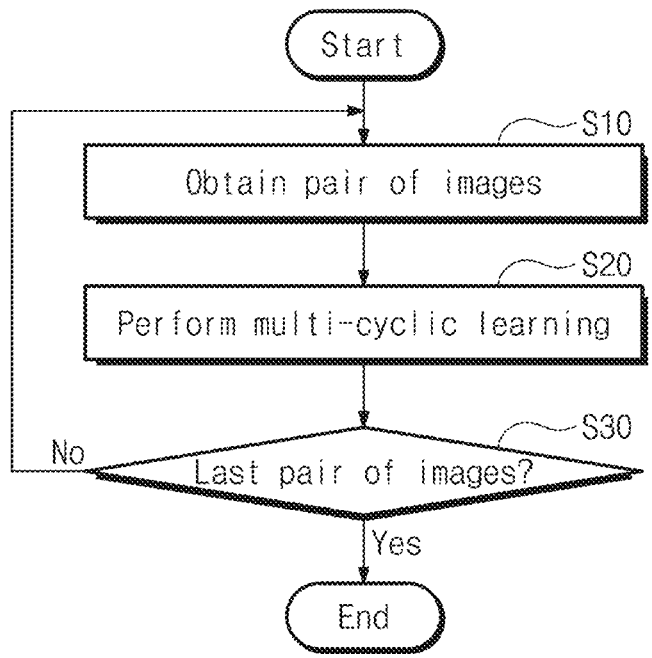
FIG. 3 illustrates an example of a process in which processors perform learning of a monocular depth estimation module.

FIG. 3 illustrates an example of a process in which the processors 120 perform the learning of the monocular depth estimation module 130. Referring to FIGS. 1, 2, and 3, in operation S10, the processors 120 may obtain a pair of images. For example, the processors 120 may obtain a pair of images photographed by the first camera 141 and the second camera 142 or a pair of images transferred from the database 200 from the memory 150.

In operation S20, the processors 120 may perform multi-cyclic learning of the monocular depth estimation module 130 by using the pair of images. The multi-cyclic learning may include updating internal parameters, for example, weights of the first to n-th convolution layers 311 to $31n$ and/or the first to n-th pooling layers 321 to $32n$. The processors 120 may perform two or more inference operations based on the pair of images. A result of the first inference operation may be applied to the second inference operation, and thus, the inference operations may be performed cyclically.

In operation S30, whether the learning of the last pair of images is completed may be determined. When it is determined that the learning of the last pair of images is completed, the learning of the monocular depth estimation module 130 may be terminated. When it is determined that the learning of the last pair of images is not completed (e.g., when it is determined that at least one pair of images for learning has not been trained, a difference between the multi-cyclic disparities is not consistently below a threshold value, the multi-cyclic loss functions are not consistently below a threshold value, and/or the output is not within a threshold range of reliability), the processors 120 may obtain a next pair of images (in operation S10) and may perform the multi-cyclic learning (in operation S20).

Figure 4:
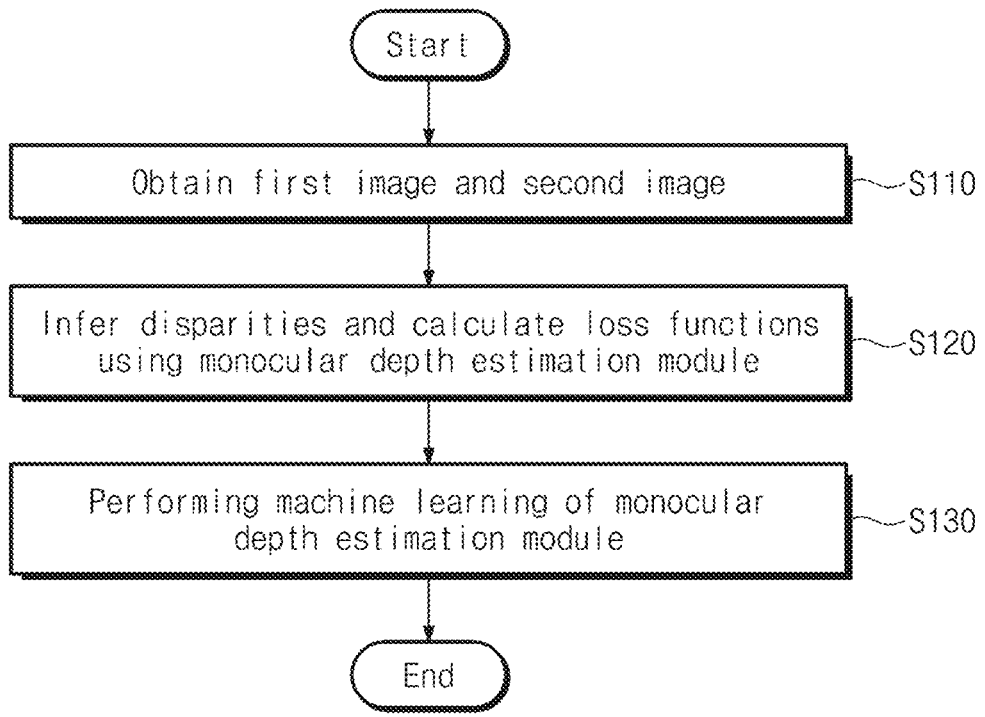
FIG. 4 illustrates an example of a process in which processors perform multi-cyclic learning of a monocular depth estimation module.

FIG. 4 illustrates an example of a process in which the processors 120 perform the multi-cyclic learning of the monocular depth estimation module 130. Referring to FIGS. 1 and 4, in operation S110, the processors 120 may obtain a first image and a second image. The first image and the second image may be a pair of images that are obtained from cameras of different locations, which face the same direction (or similar directions) or from a database. For example, the first image and the second image may be obtained from the first camera 141 and the second camera 142 or from the database 200.

In operation S120, the processors 120 may infer multi-cyclic disparities by using the monocular depth estimation module 130 and may calculate multi-cyclic loss functions. For example, the multi-cyclic disparities may be used for the processors 120 to calculate depth information. The multi-cyclic loss functions may be used for the learning (or updating) of weights of the monocular depth estimation module 130.

Operation S120 may be performed on data of the pixels of one (e.g., the first image) of the first image and the second image. The multi-cyclic learning may include a plurality of loops. In the first loop of the multi-cyclic learning, the processors 120 may infer a multi-cyclic disparity with respect to data of each pixel by using the monocular depth estimation module 130. The processors 120 may calculate depth data including pieces of depth information of the pixels from the multi-cyclic disparities of the pixels. The processors 120 may calculate multi-cyclic loss functions from the multi-cyclic disparities of the pixels.

In the second loop of the multi-cyclic learning, the processors 120 may infer a multi-cyclic disparity with respect to data of the pixels by using the monocular depth estimation module 130. For example, the processors 120 may infer a multi-cyclic disparity corresponding to each pixel based on an inference result of the first loop. The processors 120 may calculate depth data, including pieces of depth information of the pixels, from the multi-cyclic disparities of the pixels. The processors 120 may calculate multi-cyclic loss functions from the multi-cyclic disparities of the pixels.

Likewise, in each loop following the second loop of the multi-cyclic learning, the processors 120 may infer a multi-cyclic disparity with respect to data of each pixel by using the monocular depth estimation module 130. For example, the processors 120 may infer a multi-cyclic disparity corresponding to each pixel based on an inference result of the first loop. The processors 120 may calculate depth data including pieces of depth information of the pixels from the multi-cyclic disparities of the pixels. The processors 120 may calculate multi-cyclic loss functions from the multi-cyclic disparities of the pixels.

In operation S130, the processors 120 may perform machine learning of the monocular depth estimation module 130. For example, the processors 120 may perform machine learning of the monocular depth estimation module 130 based on the multi-cyclic disparities and the multi-cyclic loss functions. For example, as described with reference to FIG. 2, the machine learning of the monocular depth estimation module 130 may include updating internal parameters, for example, weights of the first to n-th convolution layers 311 to $31n$ and/or the first to n-th pooling layers 321 to $32n$. The processors 120 may train the monocular depth estimation module 130 such that a difference between the multi-cyclic disparities decreases and/or such that the multi-cyclic loss functions decrease. In some example embodiments, at least some the training may be unsupervised, which may save human labor as the images need not be labeled before or during training.

Figure 5:
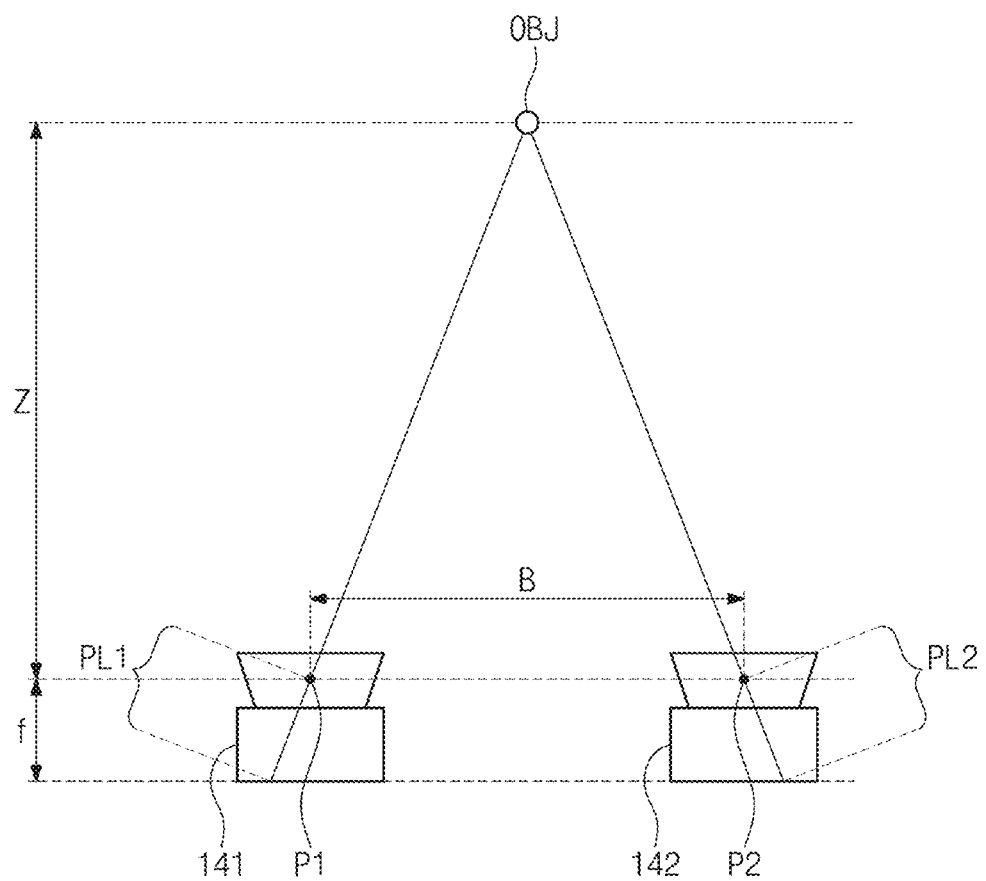
FIG. 5 illustrates an example in which an object is photographed by a first camera and a second camera.

FIG. 5 illustrates an example in which an object OBJ is photographed by the first camera 141 and the second camera 142. Referring to FIG. 5, a first point P1 may be the optical center of a lens that the first camera 141 includes. A second point P2 may be the optical center of a lens that the second camera 142 includes. The first camera 141 and the second camera 142 may be aligned to have the same focal length "f" with respect to a direction of an object OBJ.

A distance between the first point P1 and the second point P2 may be "B". A distance between the first point P1 and the object OBJ and a distance between the second point P2 and the object OBJ may be "Z". The first image may be obtained from the first camera 141, and the second image may be obtained from the second camera 142.

A light reflected from the object OBJ may arrive at a plane of an image sensor in the first camera 141 through the first point P1 being the optical center of the first camera 141. In a line that arrives at the plane of the image sensor through the first point P1 from the object OBJ, a portion from the first point P1 to the plane of the image sensor of the first camera 141 may be a first partial line PL1.

A light reflected from the object OBJ may arrive at a plane of an image sensor in the second camera 142 through the second point P2 being the optical center of the second camera 142. In a line that arrives at the plane of the image sensor through the second point P2 from the object OBJ, a portion from the second point P2 to the plane of the image sensor of the second camera 142 may be a second partial line PL2.

Figure 6:
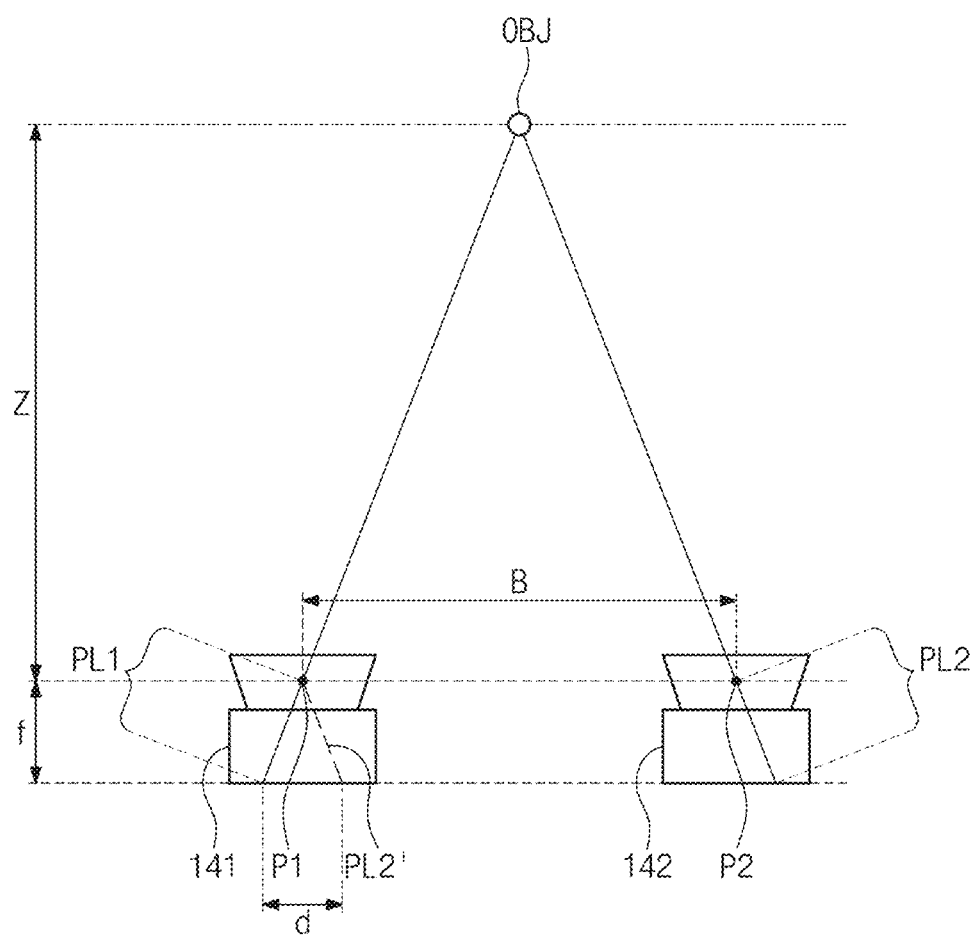
FIG. 6 illustrates a relationship between a disparity and depth information.

FIG. 6 illustrates a relationship between the multi-cyclic disparity "d" and depth information. Referring to FIGS. 5 and 6, a second partial replica line PL2' that is the same as the second partial line PL2 in length and angle may be provided between the first point P1 and the image sensor of the first camera 141.

A distance between a point at which the plane of the image sensor of the first camera 141 and the first partial line PL1 contact and a point at which the plane of the image sensor of the first camera 141 and the second partial replica line PL2' may be the multi-cyclic disparity "d". The distance "Z" to the object OBJ may be calculated by Equation 1 below based on the multi-cyclic disparity "d".

$$Z = \frac{f \times B}{d}$$ [Equation 1]

The processors 120 may calculate depth information corresponding to each of pixels, based on multi-cyclic disparities respectively corresponding to the pixels and Equation 1 above. The processors 120 may integrate the pieces of depth information of the pixels to generate depth data. For example, the depth data may include only pieces of depth information of pixels of the first image.

Figure 7:
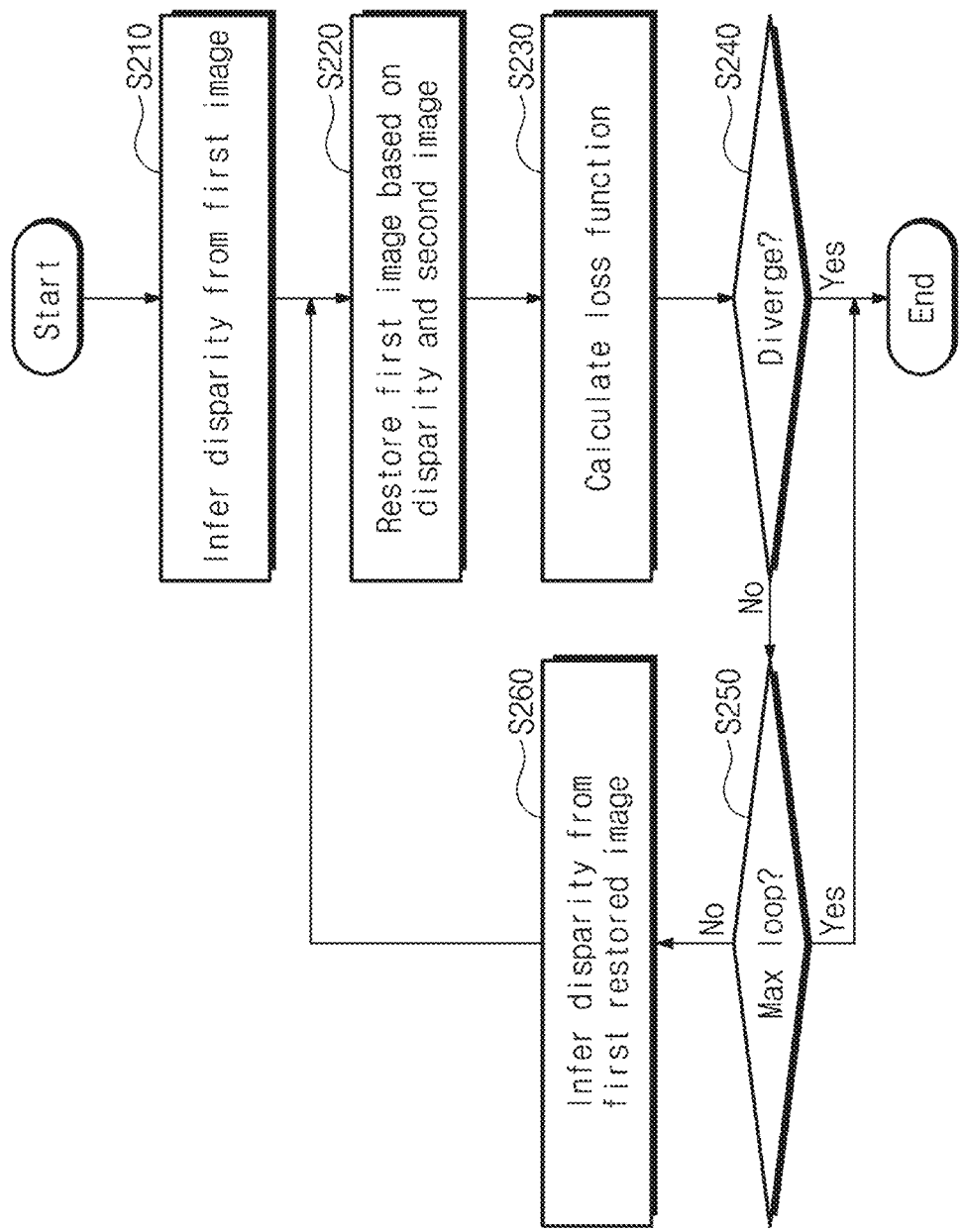
FIG. 7 illustrates an example in which processors infer multi-cyclic disparities by using a monocular depth estimation module and calculate multi-cyclic loss functions.

FIG. 7 illustrates an example in which the processors 120 infer multi-cyclic disparities by using the monocular depth estimation module 130 and calculate multi-cyclic loss functions. Referring to FIGS. 1 and 7, in operation S210, the processors 120 may apply weights of the monocular depth estimation module 130 and may infer a multi-cyclic disparity (e.g., a multi-cyclic disparity of each pixel) from the first image. In at least one embodiment, the monocular depth estimation module 130 may infer the multi-cyclic disparity of each pixel based on data of each pixel and surrounding pixels of each pixel.

In operation S220, the processors 120 may restore the first image (e.g., may generate the first image) based on the multi-cyclic disparity (e.g., the multi-cyclic disparity of each pixel) and the second image. As described with reference to FIG. 6, the multi-cyclic disparity "d" may refer to a distance at which the object OBJ is shifted and photographed from an image obtained by photographing the object OBJ through the first camera 141 and an image obtained by photographing the object OBJ through the second camera 142. Accordingly, a first restored image may be obtained from the second image by shifting each pixel of the second image photographed by using the second camera 142 as much as the multi-cyclic disparity "d" of each pixel calculated from the first image.

In operation S230, the processors 120 may calculate a multi-cyclic loss function (e.g., a multi-cyclic loss function of each pixel) of the inference of the monocular depth estimation module 130. The processors 120 may calculate a difference between data (e.g., a brightness level for each color) of the pixels of the first image and data (e.g., a brightness level for each color) of the pixels of the second image, as the multi-cyclic loss function (or a portion of the multi-cyclic loss function). The processors 120 may calculate differences between actual disparities of the pixels calculated from the first image and the second image and the inferred disparities, as multi-cyclic loss functions (or a portion of each multi-cyclic loss function). The processors 120 may add the multi-cyclic loss functions of the pixels to calculate a final multi-cyclic loss function.

In operation S240, the processors 120 may determine whether the multi-cyclic loss function diverges. For example, in a least some examples, when the multi-cyclic loss function is expressed by NaN (Not a Number) or not a value, it is determined that the multi-cyclic loss function diverges. When it is determined that the multi-cyclic loss function diverges, the processors 120 may stop the machine learning of the monocular depth estimation module 130.

In response to that the multi-cyclic loss function diverges, the processors 120 may initialize the weights of the monocular depth estimation module 130. For example, the processors 120 may initialize values of the weights updated based on a current pair of images. The processors 120 may roll the monocular depth estimation module 130 back to values of the weights that are based on a previous pair of images.

When it is determined that the multi-cyclic loss function does not diverge, in operation S250, the processors 120 may determine whether the last loop of the multi-cyclic learning is performed. A maximum value of a loop of the multi-cyclic learning may be variable, for example, may be set by the user of the electronic device 100. When it is determined that the last loop of the multi-cyclic learning is performed, the processors 120 may terminate the multi-cyclic learning of the monocular depth estimation module 130 (e.g., may terminate the learning based on the current pair of images).

When it is determined that the last loop of the multi-cyclic learning is not performed, in operation S260, the processors 120 may infer a multi-cyclic disparity (e.g., a multi-cyclic disparity of each pixel) from a third image by using the monocular depth estimation module 130. For example, the multi-cyclic disparity (e.g., the multi-cyclic disparity of each pixel) may be inferred by using the inference result of the previous loop of the multi-cyclic learning.

Afterwards, operation S220 to operation S250 may again be performed. For example, in a (k+1)-th loop (k being a positive integer representing a current loop) of the multi-cyclic learning, the processors 120 may infer a (k+1)-th multi-cyclic disparity (e.g., a (k+1)-th multi-cyclic disparity of each pixel) from a k-th restored image by using the monocular depth estimation module 130. The processors 120 may generate a (k+1)-th restored image from the second image by using the (k+1)-th multi-cyclic disparity.

The processors 120 may calculate a difference between the first image and the (k+1)-th restored image (e.g., a brightness data difference of pixels for each color), as some of multi-cyclic loss functions. Also, the processors 120 may calculate differences between restored images (e.g., brightness data differences of pixels for each color), as the others of multi-cyclic loss functions. The processors 120 may calculate differences between inferred disparities of pixels, as some of the multi-cyclic loss functions. The processors 120 may repeat the loop including operation S260 and operation S220 to operation S250, while sequentially increasing "k".

The machine learning of the monocular depth estimation module 130 may be performed such that differences between disparities decrease and such that a loss function decreases. The loss function may include a difference between the first image and a restored image and differences between restored images. The number of conditions (e.g., the number of disparities and/or the number of restored images constituting a loss function) for the learning of the monocular depth estimation module 130 may increase as the multi-cyclic learning is repeated. Accordingly, the accuracy of inference of the monocular depth estimation module 130 may be improved.

Figure 8:
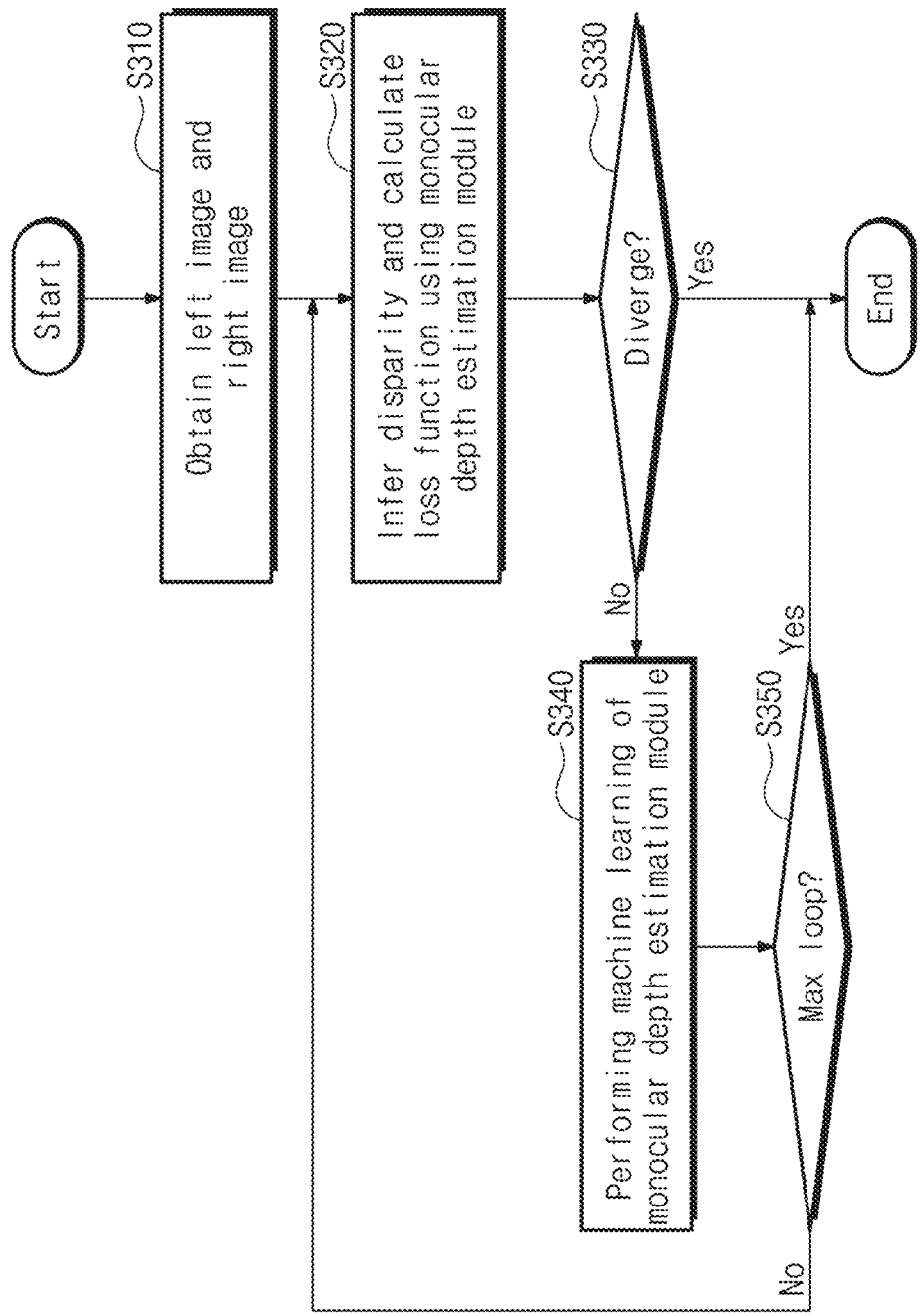
FIG. 8 illustrates another example of a process in which processors perform multi-cyclic learning of a monocular depth estimation module.

FIG. 8 illustrates another example of a process in which the processors 120 perform the multi-cyclic learning of the monocular depth estimation module 130. Referring to FIGS. 1 and 8, in operation S310, the processors 120 may generate the first image and the second image. The first image and the second image may be a pair of images that are obtained from cameras of different locations, which face the same direction (or similar directions) and/or from a database. For example, the first image and the second image may be obtained from the first camera 141 and the second camera 142 or from the database 200.

In operation S320, the processors 120 may infer a multi-cyclic disparity (e.g., a multi-cyclic disparity of each pixel) by using the monocular depth estimation module 130 and may calculate a multi-cyclic loss function (e.g., a multi-cyclic loss function of each pixel and/or an integrated multi-cyclic loss function of the pixels).

In operation S330, the processors 120 may determine whether the multi-cyclic loss function diverges. For example, when the multi-cyclic loss function is expressed by NaN (Not a Number) and/or not a value, it is determined that the multi-cyclic loss function diverges. When it is determined that the multi-cyclic loss function diverges, the processors 120 may stop the machine learning of the monocular depth estimation module 130.

In response to that the multi-cyclic loss function diverges, the processors 120 may initialize the weights of the monocular depth estimation module 130. For example, the processors 120 may initialize values of the weights updated based on a current pair of images. The processors 120 may roll the monocular depth estimation module 130 back to values of the weights that are based on a previous pair of images.

When it is determined that the multi-cyclic loss function does not diverge, in operation S340, the processors 120 may perform the multi-cyclic machine learning of the monocular depth estimation module 130. For example, the processors 120 may perform machine learning based on a disparity (or disparities) and a restored image(s) collected until now.

In operation S350, the processors 120 may determine whether the last loop of the multi-cyclic learning is performed. A maximum value of a loop of the multi-cyclic learning may be variable, for example, may be set by the user of the electronic device 100. When it is determined that the last loop of the multi-cyclic learning is performed, the processors 120 may terminate the multi-cyclic learning of the monocular depth estimation module 130 (e.g., may terminate the learning based on the current pair of images).

When it is determined that the last loop of the multi-cyclic learning is not performed, operation S320 to operation S350 may again be performed. For example, in a (k+1)-th loop of the multi-cyclic learning, the processors 120 may infer a (k+1)-th multi-cyclic disparity (e.g., a (k+1)-th multi-cyclic disparity of each pixel) from a k-th restored image by using the monocular depth estimation module 130. The processors 120 may generate a (k+1)-th restored image from the second image by using the (k+1)-th multi-cyclic disparity.

The processors 120 may calculate a difference between the first image and the (k+1)-th restored image (e.g., a brightness data difference of pixels for each color), as some of multi-cyclic loss functions. Also, the processors 120 may calculate differences between restored images (e.g., brightness data differences of pixels for each color), as the others of multi-cyclic loss functions. The processors 120 may calculate differences between inferred disparities of pixels, as some of the multi-cyclic loss functions.

The processors 120 may perform machine learning of the monocular depth estimation module 130 such that the number of multi-cyclic loss functions collected until now decreases (e.g., a difference between inferred multi-cyclic disparities decreases, such that a difference between the first image and restored images decreases, and/or such that a difference between restored images decreases). The processors 120 may repeat the loop including operation S320 to operation S350, while sequentially increasing "k".

Figure 9:
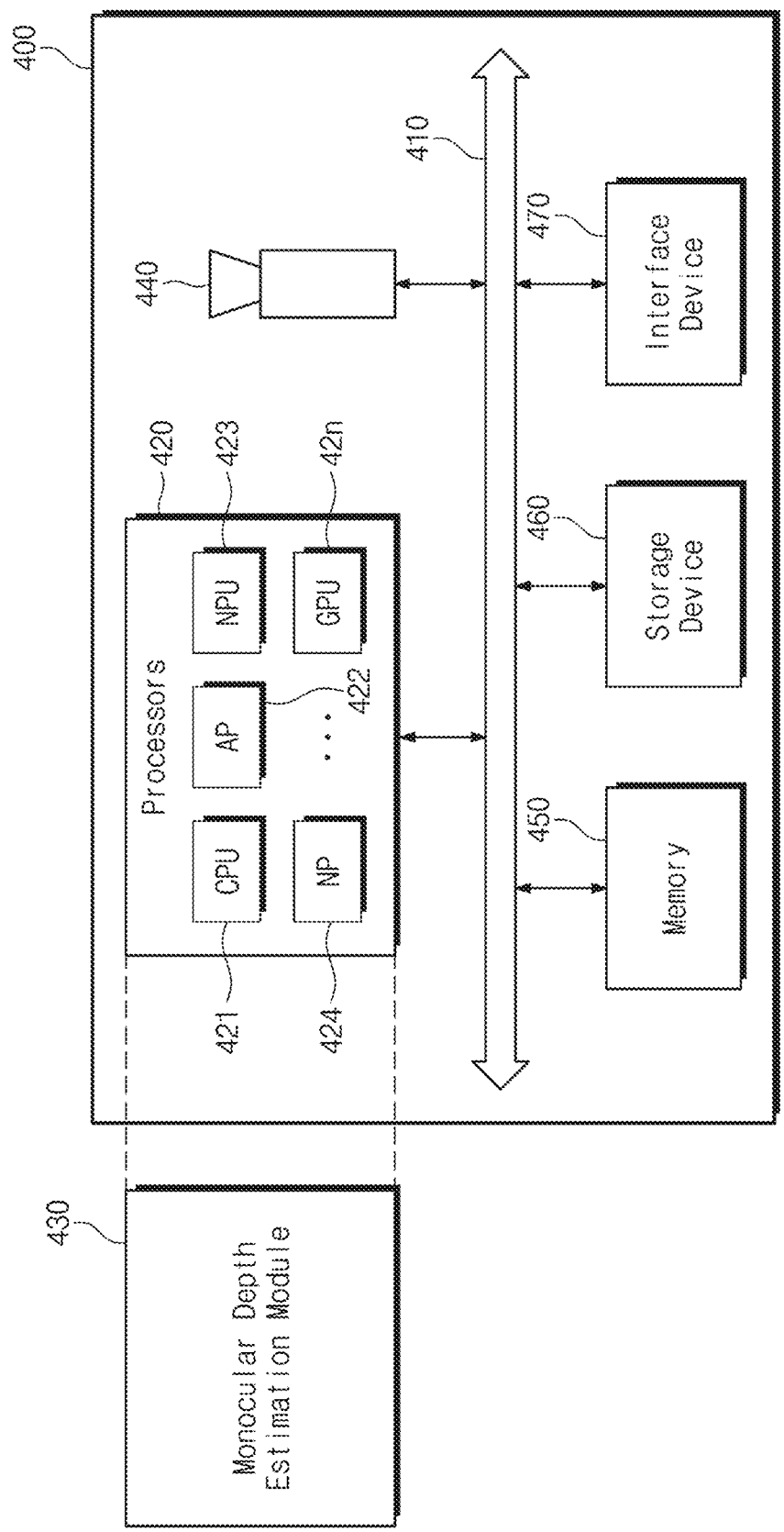
FIG. 9 illustrates an electronic device according to at least one embodiment of the present disclosure.

FIG. 9 illustrates an electronic device 400 according to at least one embodiment of the present disclosure. Referring to FIG. 9, the electronic device 400 may include a bus 410, processors 420, a camera 440, a memory 450, a storage device 460, and an interface device 470.

The bus 410 may provide a channel between the components of the electronic device 400. The bus 410 may transfer various signals including at least one of a command, an address, data, and a control signal between the components of the electronic device 400.

The processors 420 may execute an operating system and various applications of the electronic device 400. The processors 420 may include at least one processor. For example, the processors 420 may include at least one of various processors (or processing cores) such as a central processing unit (CPU) 421, an application processor (AP) 422, a neural processing unit (NPU) 423, a neuromorphic processor (NP) 424, and/or a graphics processing unit (GPU) 42n, and/or the like.

At least one of the processors 420 may execute a monocular depth estimation module 430. For example, the monocular depth estimation module 430 may be implemented based on a neural network. The monocular depth estimation module 430 may refer to a module that trained based on the multi-cyclic machine learning described with reference to FIGS. 1 to 8.

The camera 440 may photograph an image. The image captured by the camera 440 may be transferred to the memory 450 through the bus 410. The processors 420 may generate depth data from the image stored in the memory 450 by using the monocular depth estimation module 430. For example, the processors 420 may infer disparities corresponding to pixels of the image of the memory 450 by using the monocular depth estimation module 430 and may generate depth data based on the disparities.

The memory 450 may be used as a working memory of the processors 420. The memory 450 may be implemented with various random access memories such as a dynamic random access memory (DRAM), a magnetic RAM (MRAM), a phase-change RAM (PRAM), a ferroelectric RAM (FRAM), a resistive RAM (RRAM), and/or the like.

The storage device 460 may store original or backup copies of various data that are used by the processors 420. The storage device 460 may be and/or include, for example, non-volatile memory implemented with a hard disk drive or a solid state drive. The solid state drive may be implemented with various nonvolatile solid state memories such as flash memory, magnetic memory, ferroelectric memory, phase-change memory, resistive memory, and/or the like.

The interface device 470 may be configured to communicate with the outside. For example, the interface device 470 may include an input interface (e.g., a keyboard, a mouse, a microphone, a touch pad, a touch panel, or a sensor) receiving information from the outside, and/or an output interface (e.g., a monitor, a speaker, a projector, or a ramp) outputting information to the outside. In some example embodiments, the interface device 470 may include various wired or wireless interfaces, which may communicate with external devices. In some example embodiments, the interface device 470 may receive updates for training (or re-training) the monocular depth estimation module 430. For example, the monocular depth estimation module 430 may be updated to match a monocular depth estimation module (130) trained on an electrical device 100, and/or the electronic device 100 may be modified to match the electronic device 400, e.g., after being training based on the multi-cyclic machine learning described with reference to FIGS. 1 to 8.

Figure 10:
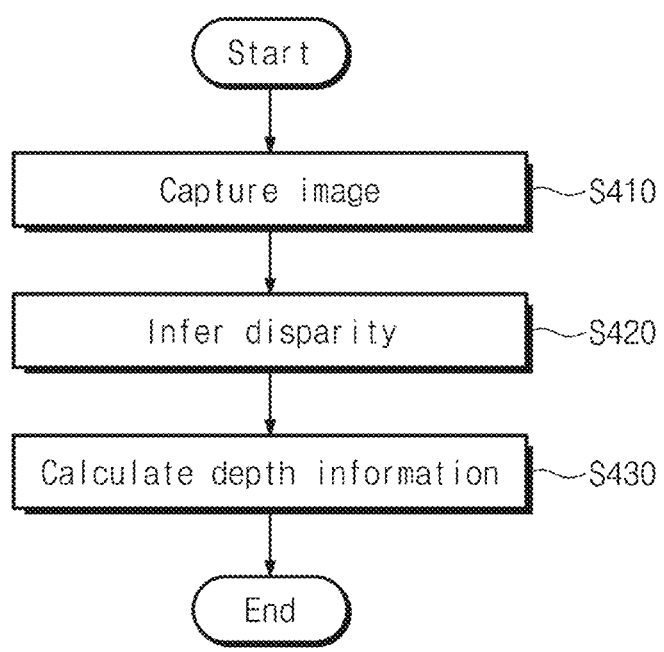
FIG. 10 illustrates an example of an operating method of an electronic device of FIG. 9.

FIG. 10 illustrates an example of an operating method of the electronic device 400 of FIG. 9. Referring to FIGS. 9 and 10, in operation S410, the electronic device 400 may capture an image by using the camera 440. The captured image may be stored in the memory 450.

In operation S420, the processors 420 may infer a disparity (e.g., a disparity of each pixel) from the image by using the monocular depth estimation module 430. Because the monocular depth estimation module 430 is trained through the multi-cyclic machine learning, the accuracy of the inferred disparity (e.g., the disparity of each pixel) may be high.

In operation S430, the processors 420 may calculate depth information (e.g., depth information of each pixel) from the disparity (e.g., the disparity of each pixel). For example, the processors 420 may calculate the depth information of each pixel based on Equation 1. The processors 420 may integrate the depth information of each pixel to generate depth data.

For example, the generated depth data may be used to determine a driving route of the autonomous vehicle. For example, the processors 420 may identify distances to various objects (such as an obstacle, a pedestrian, a street tree, a streetlight, an adjacent vehicle, and/or the like) from the depth data. The processors 420 may determine a driving route capable of driving safely (e.g., avoiding the various objects), based on the identified distances.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a monocular depth estimation module is repeatedly trained based on a multi-cyclic scheme. Accordingly, an electronic device implementing the monocular depth estimation module with improved accuracy and an operating method of the electronic device are provided.

While the present disclosure has been described with reference to some example embodiments thereof, it will be apparent to those of ordinary skill in the art that various changes and modifications may be made thereto without departing from the spirit and scope of the present disclosure as set forth in the following claims.

What is claimed is:

1. An operating method of an electronic device which includes a processor configured to train a monocular depth estimation module, the method comprising:
   obtaining, by the processor, a first image photographed by a first camera and a second image photographed by a second camera;
   inferring, by the processor, a plurality of multi-cyclic disparities by applying weights of the monocular depth estimation module to the first image a plurality of times and calculating a plurality of multi-cyclic loss functions based on the first image, the second image, and the plurality of multi-cyclic disparities; and
   updating, by the processor, the weights of the monocular depth estimation module through the training based on the plurality of multi-cyclic loss functions,
   wherein the calculating of the plurality of multi-cyclic loss functions includes
      inferring a (k+1)-th multi-cyclic disparity of the plurality of multi-cyclic disparities from a k-th restored image by applying the weights of the monocular depth estimation module,
      generating a (k+1)-th restored image from the second image by using the (k+1)-th multi-cyclic disparity, and
      calculating a difference between the first image and the (k+1)-th restored image as at least another of the multi-cyclic loss functions, and
   wherein k is a positive integer.

2. The method of claim 1, wherein the plurality of multi-cyclic disparities are respectively inferred with respect to pixels of the first image.

3. The method of claim 1, wherein the calculating of the plurality of multi-cyclic loss functions further includes, prior to the inferring the (k+1)-th multi-cycle disparity:
   inferring a first multi-cyclic disparity of the plurality of multi-cyclic disparities from the first image by applying the weights of the monocular depth estimation module;
   generating a first restored image from the second image using the first multi-cyclic disparity; and
   calculating a difference between the first image and the first restored image as a first multi-cyclic loss function of the plurality of multi-cyclic loss functions.

4. The method of claim 1, wherein the updating of the weights of the monocular depth estimation module through the training includes:

updating the weights of the monocular depth estimation module through the training such that differences between the plurality of multi-cyclic disparities decrease.

5. The method of claim 1, wherein the updating of the weights of the monocular depth estimation module through the training includes:
updating the weights of the monocular depth estimation module through the training such that a sum of the plurality of multi-cyclic disparities decreases.

6. The method of claim 1, further comprising:
obtaining, by the processor, a third image photographed by a third camera and a fourth image photographed by a fourth camera;
inferring, by the processor, a plurality of second multi-cyclic disparities by applying weights of the monocular depth estimation module to the third image and calculating a plurality of second multi-cyclic loss functions based on the third image, the fourth image, and the plurality of second multi-cyclic disparities; and
updating, by the processor, the weights of the monocular depth estimation module through the training, based on the plurality of second multi-cyclic loss functions.

7. The method of claim 1, wherein the calculating of the plurality of multi-cyclic loss functions includes repeating the inferring of the (k+1)-th multi-cyclic disparity, the generating of the (k+1)-th restored image, and the calculating of the difference between the first image and the (k+1)-th restored image until the "k" reaches a maximum value while sequentially increasing the "k".

8. The method of claim 7, wherein the maximum value of the "k" is set by a user.

9. The method of claim 1, wherein the calculating of the plurality of multi-cyclic loss functions includes repeating the inferring of the (k+1)-th multi-cyclic disparity, the generating of the (k+1)-th restored image, and the calculating of the difference between the first image and the (k+1)-th restored image while sequentially increasing the "k" until at least one of the plurality of multi-cyclic loss functions diverges.

10. The method of claim 9, wherein the weights of the monocular depth estimation module are initialized in response to the at least one of the plurality of multi-cyclic loss functions diverging.

11. The method of claim 1, wherein the calculating of the plurality of multi-cyclic loss functions further includes:
repeating, at least once, the inferring of the (k+1)-th multi-cyclic disparity, the generating of the (k+1)-th restored image, and the calculating of the difference between the first image and the (k+1)-th restored image; and
calculating differences between the (k+1)-th restored images as others of the multi-cyclic loss functions.

12. An electronic device comprising:
a first camera;
an interface device configured to communicate with an external database; and
a processor configured to execute a monocular depth estimation module, the processor configured to
obtain a first image and a second image from the external database through the interface device,
infer a plurality of multi-cyclic disparities corresponding to pixels of the second image by applying weights of the monocular depth estimation module to the first image and calculate a plurality of multi-cyclic loss functions corresponding to the pixels of the second image based on the first image, the second image, and the plurality of multi-cyclic disparities, and
update the weights of the monocular depth estimation module through machine learning based on the plurality of multi-cyclic loss functions, and
wherein the processor is further configured to
obtain a third image from the first camera,
infer disparities by applying the weights of the monocular depth estimation module to the third image, and
calculate depth data of the third image from the disparities,
wherein, while sequentially increasing "k" (k being a positive integer), the processor is configured to repeat operations
calculating a (k+1)-th multi-cyclic disparity from a k-th restored image by using the weights of the monocular depth estimation module,
generating a (k+1)-th restored image from the first image by using the (k+1)-th multi-cyclic disparity,
calculating a (k+1)-th multi-cyclic loss function based on a difference between the second image and the (k+1)-th restored image and differences between the first to k-th multi-cyclic disparities, and
updating the weights of the monocular depth estimation module through the machine learning based on the (k+1)-th multi-cyclic loss function.

13. The electronic device of claim 12, further comprising:
a second camera,
wherein the processor is further configured to
obtain a fourth image from the second camera, respectively,
infer a plurality of second multi-cyclic disparities respectively corresponding to pixels of the third image by applying weights of the monocular depth estimation module to the fourth image and calculate a plurality of second multi-cyclic loss functions respectively corresponding to the pixels of the third image based on the third image, the fourth image, and the plurality of second multi-cyclic disparities, and
update the weights of the monocular depth estimation module through the machine learning based on the plurality of second multi-cyclic loss functions.

14. The electronic device of claim 12, wherein the processor is further configured to, prior to the inferring the (k+1)-th multi-cycle disparity,
calculate a first multi-cyclic disparity from the first image using the monocular depth estimation module,
generating a first restored image from the first image using the first multi-cyclic disparity,
calculate a first multi-cyclic loss function based on a difference between the second image and the first restored image, and
perform machine learning of the monocular depth estimation module based on the first multi-cyclic loss function.

15. The electronic device of claim 14, wherein the processor is further configured to
calculate differences between the first to (k+1)-th restored images as an additional (k+1)-th multi-cyclic loss function, and
update the weights of the monocular depth estimation module through the machine learning based on the additional (k+1)-th multi-cyclic loss function.

16. The electronic device of claim 12, wherein the processor is further configured to calculate differences between the first to (k+1)-th restored images as an additional (k+1)-th multi-cyclic loss function, and update the weights of the monocular depth estimation module through the machine learning based on the additional (k+1)-th multi-cyclic loss function.

17. The electronic device of claim 12, wherein the processor is further configured to initialize the monocular depth estimation module in response to the (k+1)-th multi-cyclic loss function diverging.

18. An electronic device comprising:
a camera; and
a processor configured to execute a monocular depth estimation module,
wherein the processor is configured to
obtain an image from the camera,
infer disparities from the image using the monocular depth estimation module, and
generate depth data of the image from the disparities, and wherein the monocular depth estimation module is trained based on a plurality of multi-cyclic disparities and a plurality of multi-cyclic loss functions respectively generated from pixels, and wherein the plurality of multi-cyclic loss functions are generated by
inferring a (k+1)-th multi-cyclic disparity of the plurality of multi-cyclic disparities from a k-th restored image by applying weights of the monocular depth estimation module, generating a (k+1)-th restored image from a second image by using the (k+1)-th multi-cyclic disparity, and calculating a difference between a first image and the (k+1)-th restored image as at least another of the multi-cyclic loss functions, and wherein k is a positive integer.

* * * * *